US012720465B2

(12) United States Patent
Yu et al.

(10) Patent No.: US 12,720,465 B2
(45) Date of Patent: Aug. 25, 2026

(54) RANGING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventors: Lei Yu, Beijing (CN); Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 217 days.

(21) Appl. No.: 18/287,453

(22) PCT Filed: Apr. 19, 2021

(86) PCT No.: PCT/CN2021/088204
§ 371 (c)(1),
(2) Date: Oct. 18, 2023

(87) PCT Pub. No.: WO2022/222006
PCT Pub. Date: Oct. 27, 2022

(65) Prior Publication Data

US 2024/0381289 A1 Nov. 14, 2024

(51) Int. Cl.

*H04W 24/00* (2009.01)
*H04W 12/043* (2021.01)
*H04W 12/106* (2021.01)
*H04W 28/06* (2009.01)
*H04W 64/00* (2009.01)

(52) U.S. Cl.
CPC ......... *H04W 64/00* (2013.01); *H04W 12/043* (2021.01); *H04W 12/106* (2021.01); *H04W 28/06* (2013.01)

(58) Field of Classification Search
CPC ... H04W 12/106; H04W 64/00; H04W 12/63; H04W 12/043; H04W 12/00
See application file for complete search history.

(56) References Cited

U.S. PATENT DOCUMENTS 11,652,617 B1 * 5/2023 de Haas ................ H04W 76/10 713/171
2003/0026426 A1 * 2/2003 Wright ................ H04L 63/0807 713/153

(Continued)

FOREIGN PATENT DOCUMENTS

CN 101014185 A 8/2007
CN 104243153 A 12/2014

(Continued)

OTHER PUBLICATIONS

International Search Report issued in Application No. PCT/CN2021/088204, dated Jan. 19, 2022, with English translation,(6p).

(Continued)

*Primary Examiner* — Shantell L Heiber
(74) *Attorney, Agent, or Firm* — Arch & Lake LLP; Hao Tan; Shen Wang

(57) ABSTRACT

Embodiments of the present disclosure provide a ranging method. The method includes: broadcasting a first message, the first message being used to indicate a first public key of the first terminal; receiving a second message sent from a second terminal, the second message being used to indicate a second public key of the second terminal encrypted by the first public key; and sending a third message encrypted by the second public key to the second terminal, the third message being used to indicate a first time difference between a sending time of the first message and a receiving time of the second message.

20 Claims, 10 Drawing Sheets

(56) References Cited

U.S. PATENT DOCUMENTS

| | | | | |
|---|---|---|---|---|
| 2009/0019284 | A1* | 1/2009 | Cho | H04L 9/3273 713/170 |
| 2016/0242056 | A1 | 8/2016 | Patil et al. | |
| 2017/0346852 | A1 | 11/2017 | Chhabra et al. | |
| 2018/0332075 | A1 | 11/2018 | Chhabra et al. | |
| 2018/0335514 | A1* | 11/2018 | Dees | G01S 7/36 |
| 2018/0367994 | A1 | 12/2018 | Danev | |
| 2020/0150262 | A1 | 5/2020 | Kim et al. | |
| 2022/0086644 | A1* | 3/2022 | Johansson | H04L 9/3247 |
| 2023/0021047 | A1* | 1/2023 | Ammar | H04L 9/0847 |
| 2023/0049548 | A1* | 2/2023 | Zhang | H04M 1/72442 |

FOREIGN PATENT DOCUMENTS

| | | | |
|---|---|---|---|
| CN | 106043232 | A | 10/2016 |
| CN | 107438230 | A | 12/2017 |
| CN | 108291960 | A | 7/2018 |
| CN | 107251621 | A | 10/2018 |
| CN | 110717177 | A | 1/2020 |
| CN | 111866872 | A | 10/2020 |
| CN | 115308725 | A | 11/2020 |
| IN | 108701380 | A1 | 10/2018 |
| KR | 20200070054 | A | 6/2020 |
| WO | 2019067105 | A1 | 4/2019 |

OTHER PUBLICATIONS

Xiaomi, “FS_Ranging Security and authorization issues,” 3GPP TSG-SA WG1 Meeting #92e, S1-204099, Online, Nov. 9-18, 2020, (3p).

The First Office Action of CN202180001196.4 dated Jun. 2, 2025, (17p).

The Second Office Action of CN202180001196.4 dated Jan. 30, 2026, (19p).

* cited by examiner first terminal second terminal step 151, determine that a result of the integrity protection verification of the third message indicates successful verification and the third message is not replayed; and determine whether to measure the distance between the first terminal and the second terminal according to the ID of the first terminal.

wireless transmission

FIG. 15 first terminal second terminal step 161, determine that the ID of the first terminal is a predetermined ID, and determine to measure the distance between the first terminal and the second terminal; or, determined that the ID of the first terminal is not the predetermined ID, and determine not to measure the distance between the first terminal and the second terminal wireless transmission

FIG. 16 first terminal second terminal step 171, determine the distance between the first terminal and the second terminal based on the first time difference and the second time difference, where the second time difference is a time difference between a receiving time of the first message and a sending time of the second message wireless transmission

FIG. 17

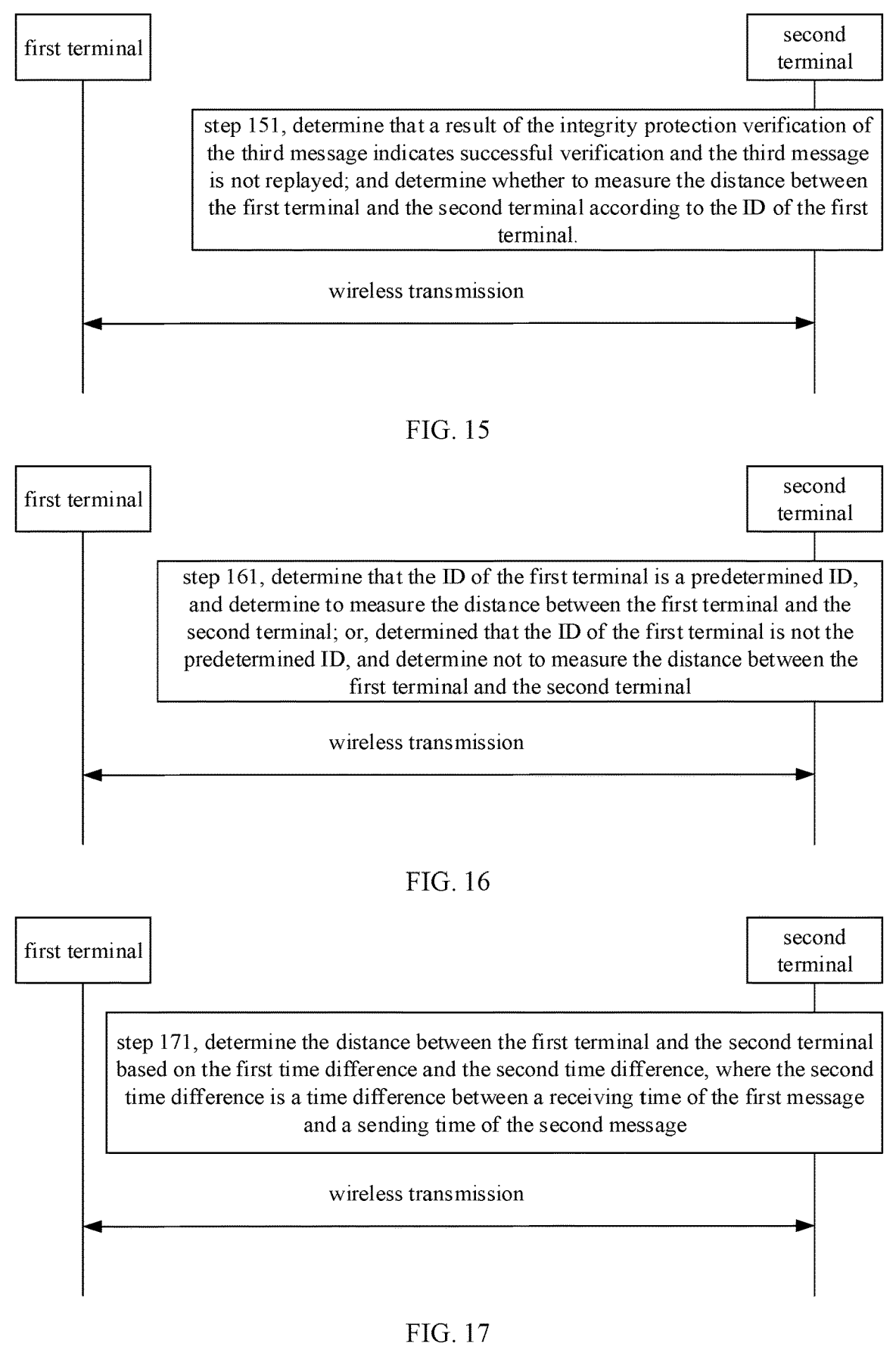

RANGING METHOD AND APPARATUS, COMMUNICATION DEVICE, AND STORAGE MEDIUM

TECHNICAL FIELD

The present disclosure relates to the wireless communication technical field, and more specifically, to a ranging method and apparatus, a communication device and a storage medium.

BACKGROUND

With the continuous developments of wireless communication networks, there are increasing demands for ranging between devices. Taking the Time of Flight (ToF) method as an example, the ToF method is a very popular ranging technology; when ToF uses a wireless signal for ranging, a measuring device sends a measurement signal to a measured device, the measured device returns the measurement signal after receiving the measurement signal, and the measuring device may calculate a distance between the devices based on the flight time of the measurement signal.

In related art, when performing secure ranging between devices, especially when there are a large number of ranging needs, a large amount of time and signaling resources will be consumed.

SUMMARY

Embodiments of the present disclosure provide a ranging method and apparatus, a communication device and a storage medium.

According to a first aspect of embodiments of the present disclosure, there is provided a ranging method, where the method is performed by a first terminal and the method includes:

- broadcasting a first message, where the first message is used to indicate a first public key of the first terminal;
- receiving a second message sent from a second terminal, where the second message is used to indicate a second public key of the second terminal encrypted by the first public key; and
- sending a third message encrypted by the second public key to the second terminal, where the third message is used to indicate a first time difference between a sending time of the first message and a receiving time of the second message.

In an embodiment, the method further includes:

- performing integrity protection on the first message and/or the third message based on a first private key of the first terminal.

In an embodiment, the method further includes:

- determining that the first message is replayed; and discarding the second message; or
- determining that the first message is not replayed; and determining whether to send the third message according to a result of whether the second message is replayed.

In an embodiment, determining a sending operation of the third message according to the determination result of whether the second message is replayed includes:

- determining that the second message is replayed; and determining not to send the third message; or
- determining that the second message is not replayed; and determining to send the third message.

In an embodiment, the first message is further used to indicate at least one of the following:

- an identity (ID) of the first terminal;
- a first random number generated by the first terminal, where the first random number is used to determine whether the first message is replayed; or
- a command ID of the first message.

In an embodiment, the second message is further used to indicate at least one of the following:

- an application ID encrypted by the first public key, where the application ID is used to trigger the second terminal to send the second message;
- a first random number generated by the first terminal, where the first random number is used to determine whether the first message is replayed;
- a second random number generated by the second terminal, where the second random number is used to determine whether the second message is replayed; or
- a command ID of the first message.

In an embodiment, the second message indicates the first random number encrypted by the first public key, and the method further includes:

- determining that the first message is not replayed, where the first random number decrypted by the first private key is not a repeated random number; or
- determining that the first message is replayed, where the first random number decrypted by the first private key is a repeated random number.

In an embodiment, the second message indicates the second random number encrypted by the first public key, and the method further includes:

- determining that the second message is not replayed, where the second random number decrypted by the first private key is not a repeated random number; or
- determining that the second message is replayed, where the second random number decrypted by the first private key is a repeated random number.

In an embodiment, the second message indicates the application ID, and sending the third message encrypted by the second public key to the second terminal includes:

- sending the third message determined based on the application ID to the second terminal.

In an embodiment, the third message is further used to indicate at least one of the following:

- an ID of the first terminal;
- a third random number generated by the first terminal, where the third random number is used to determine whether the third message is replayed; or
- a command ID of the first message.

According to a second aspect of embodiments of the present disclosure, there is provided a ranging method, where the method is performed by a second terminal, and the method includes:

- receiving a first message sent from a first terminal, where the first message is used to indicate a first public key of the first terminal;
- send a second message to the first terminal, where the second message is used to indicate a second public key of the second terminal encrypted by the first public key; and
- receive a third message encrypted by the second public key sent from the second terminal, where the third message is used to indicate a first time difference between a sending time of the first message and a receiving time of the second message, and the first time difference is used to determine a distance between the first terminal and the second terminal.

In an embodiment, the method further includes:

based on the first public key of the first terminal, performing integrity protection verification on the first message.

In an embodiment, the method further includes:

determining whether to send the second message according to a verification result of the integrity verification.

In an embodiment, determining a sending operation of the second message according to the result of the integrity verification includes:

determining that the result indicates successful verification; and determine to send the second message; or determining that the result indicates failed verification; and determining to discard the first message and not to send the second message.

In an embodiment, the method further includes:

based on the first public key of the first terminal, performing integrity protection verification on the third message.

In an embodiment, the third message is further used to indicate at least one of the following:

an ID of the first terminal;

a third random number generated by the first terminal, where the third random number is used to determine whether the third message is replayed; or a command ID of the first message.

In an embodiment, the third message indicates the third random number encrypted by the second public key, and the method further includes:

determining that the third message is not replayed, where the third random number decrypted by the second private key is not a repeated random number; or determining that the third message is replayed, where the third random number decrypted by the second private key is a repeated random number.

In an embodiment, the third message indicates the ID of the first terminal, and the method further includes:

determining that a result of the integrity protection verification of the third message indicates successful verification and that the third message is not replayed; and determining whether to measure the distance between the first terminal and the second terminal according to the ID of the first terminal.

In an embodiment, determining whether to measure the distance between the first terminal and the second terminal according to the ID of the first terminal includes:

determining that the ID of the first terminal is a predetermined ID; and determining to measure the distance between the first terminal and the second terminal; or determining that the ID of the first terminal is not the predetermined ID; and determining not to measure the distance between the first terminal and the second terminal.

In an embodiment, the method further includes:

determining the distance between the first terminal and the second terminal based on the first time difference and a second time difference, where the second time difference is a time difference between a receiving time of the first message and a sending time of the second message.

In an embodiment, the first message is further used to indicate at least one of the following:

an identity ID of the first terminal;

a first random number generated by the first terminal, where the first random number is used to determine whether the first message is replayed; or a command ID of the first message.

In an embodiment, the second message is further used to indicate at least one of the following:

an application ID encrypted by the first secret key, where the application ID is used to trigger the second terminal to send the second message;

a first random number generated by the first terminal, where the first random number is used to determine whether the first message is replayed;

a second random number generated by the second terminal, where the second random is used to determine whether the second message is replayed; or a command ID of the first message.

According to a third aspect of embodiments of the present disclosure, there is provided a ranging apparatus, including:

a sending module, configured to broadcast a first message, where the first message is used to indicate a first public key of the apparatus;

a first receiving module, configured to receive a second message sent from a second terminal, where the second message is used to indicate a second public key of the second terminal encrypted by the first public key; and a first sending module configured to send a third message encrypted by the second public key to the second terminal, where the third message is used to indicate a first time difference between a sending time of the first message and a receiving time of the second message.

According to a fourth aspect of embodiments of the present disclosure, there is provided a ranging apparatus, including:

a receiving module, configured to receive a first message sent from a first terminal, where the first message is used to indicate a first public key of a first terminal;

a first sending module, configured to send a second message to the first terminal, where the second message is used to indicate a second public key of the second terminal encrypted by the first public key; and a second receiving module configured to receive a third message encrypted by the second public key sent from the apparatus, where the third message is used to indicate a first time difference between a sending time of the first message and a receiving time of the second message, and the first time difference is used to determine a distance between the first terminal and the apparatus.

According to a fifth aspect of embodiments of the present disclosure, there is provided a communication device, including:

a processor;

a memory for storing instructions executable by the processor;

where the processor is configured to implement the method described in any embodiment of the present disclosure when running the executable instructions.

According to a sixth aspect of embodiments of the present disclosure, a computer storage medium is provided. The computer storage medium stores a computer executable program. When the executable program is executed by a processor, the method described in any embodiment of the present disclosure is implemented.

In embodiments of the present disclosure, a first message is broadcast; the first message is used to indicate a first public key of a first terminal. And, a second message sent from a second terminal is received; the second message is used to indicate a second public key of the second terminal encrypted by the first public key. A third message encrypted by the second public key is sent to the second terminal; the third message is used to indicate a first time difference between a sending time of the first message and a receiving time of the second message. Here, when measuring the distance between the first terminal and the second terminal, the first message is used to indicate the first public key; the second message is used to indicate the second public key and the second public key is encrypted by the first public key; and the third message is encrypted by the second public key. Compared with a method which uses additional message(s) to carry security information to ensure the security of the transmission of ranging information, the technical solutions of the present disclosure carry the security information in the first message and the second message used for ranging. In this way, while ensuring safe transmission of information, the technical solutions of the present disclosure can reduce the consumption of signaling resources and save ranging time.

BRIEF DESCRIPTION OF THE DRAWINGS

FIG. 15 is a schematic flowchart of a ranging method according to an exemplary embodiment.

FIG. 16 is a schematic flowchart of a ranging method according to an exemplary embodiment.

FIG. 17 is a schematic flowchart of a ranging method according to an exemplary embodiment.

DETAILED DESCRIPTION

Reference will now be made in detail to exemplary embodiments, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the embodiments of the present disclosure. Rather, they are merely examples of apparatuses and methods consistent with aspects of the disclosed embodiments as recited in the appended claims.

Terms used in the embodiments of the present disclosure are for the purpose of describing specific embodiments only, and are not intended to limit the embodiments of the present disclosure. As used in the examples of the present disclosure and the appended claims, singular forms “a/an” and “the” are also intended to include a plural form unless the context clearly indicates otherwise. It should also be understood that the term “and/or” as used herein refers to and includes any or all possible combinations of one or more of associated listed items.

It should be understood that although the terms first, second, third, etc. may be used to describe various information in the embodiments of the present disclosure, the information should not be limited by these terms. These terms are only used to distinguish information of the same type from each other. For example, without departing from the scope of the embodiments of the present disclosure, first information may also be called second information, and similarly second information may also be called first information. Depending on the context, the word “if” as used herein may be interpreted as “when” or “upon . . . ” or “in response to determining . . . ”.

For the purpose of simplicity and ease of understanding, the present disclosure uses the terms “greater than” or “less than” when representing a magnitude relationship. However, those skilled in the art can understand that the term “greater than” also encompasses the meaning of “greater than or equal to”, and “less than” also encompasses the meaning of “less than or equal to”.

Figure 1:
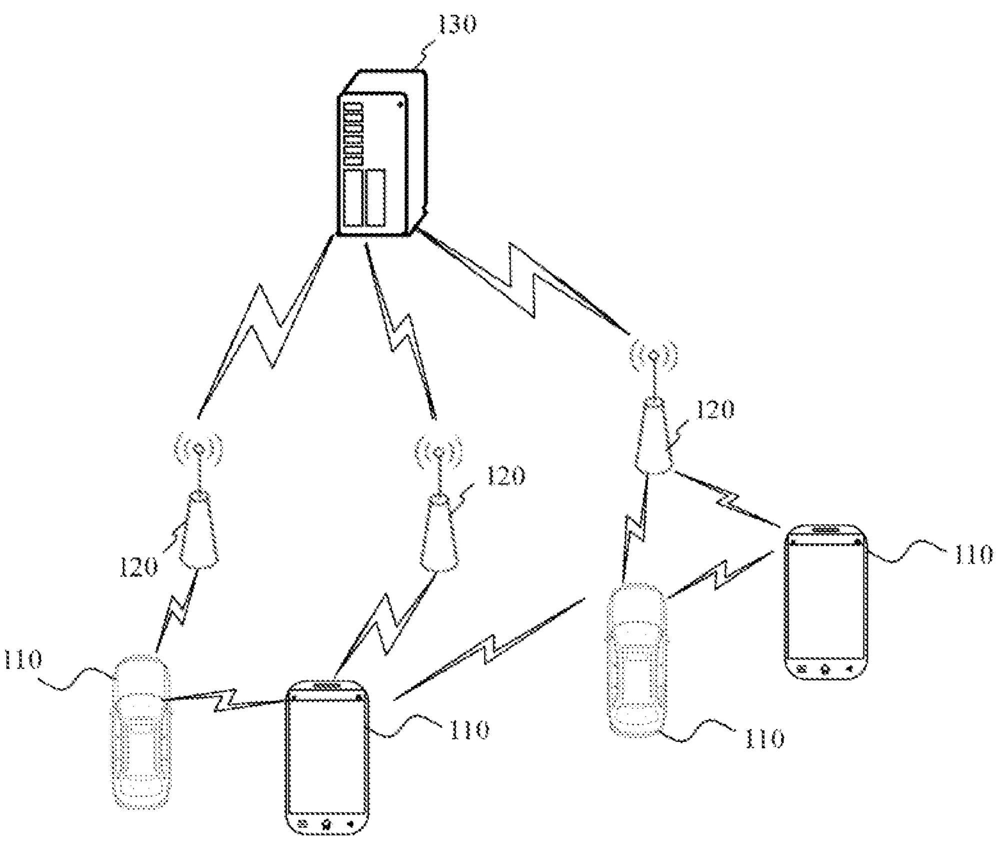
FIG. 1 is a schematic structural diagram of a wireless communication system according to an exemplary embodiment.

FIG. 1 which shows a schematic structural diagram of a wireless communication system provided by an embodiment of the present disclosure. As shown in FIG. 1, the wireless communication system is a communication system based on a mobile communication technology, and the wireless communication system may include: several user equipment 110 and several base stations 120.

User equipment 110 may be a device that provides voice and/or data connectivity to a user. The user equipment 110 may communicate with one or more core networks via a Radio Access Network (RAN). The user equipment 110 may be an Internet of Things user equipment, such as a sensor device, a mobile phone, and a computer with an Internet of Things user equipment, for example, it may be a fixed, portable, pocket-sized, handheld, computer-built-in or vehicle-mounted device, for example, Station (STA), subscriber unit, subscriber station, mobile station, mobile, remote station, access point, remote user equipment (remote terminal), access user equipment (access terminal), user device (user terminal), user agent, user device, or user equipment. Alternatively, the user equipment 110 may be equipment of an unmanned aerial vehicle. Alternatively, the user equipment 110 may be a vehicle-mounted device, for example, a trip computer with a wireless communication function, or a wireless user device connected externally to a trip computer. Alternatively, the user equipment 110 may be a roadside device, for example, it may be a streetlight, a signal light or other roadside device with a wireless communication function.

A base station 120 may be a network side device in a wireless communication system. The wireless communication system may be a 4th generation mobile communication (4G) system, also known as a Long Term Evolution (LTE) system; or, the wireless communication system may be a 5G system, also called new radio system or 5G NR system. Alternatively, the wireless communication system may be a next-generation system of the 5G system. An access network in the 5G system may be called New Generation-Radio Access Network (NG-RAN).

The base station 120 may be an evolved base station (eNB) adopted in a 4G system. Alternatively, the base station 120 may be a base station (gNB) adopting a centralized and distributed architecture in the 5G system. When the base station 120 adopts a centralized and distributed architecture, it generally includes a central unit (CU) and at least two distributed units (DUs). The central unit is provided with a protocol stack of a Packet Data Convergence Protocol (PDCP) layer, a Radio Link Control (RLC) layer, and Media Access Control (MAC) layer protocol stack; the distributed unit is provided a physical (PHY) layer protocol stack; embodiments of the present disclosure do not limit the specific implementation of the base station 120.

A wireless connection may be established between the base station 120 and the user equipment 110 through a wireless air interface. In different implementations, the wireless air interface is a wireless air interface based on the fourth-generation mobile communication network technology (4G) standard; or, the wireless air interface is a wireless air interface based on the fifth-generation mobile communication network technology (5G) standard, such as the wireless air interface is a new air interface; alternatively, the wireless air interface may also be a wireless air interface based on a technical standard of a next-generation mobile communication network based on 5G.

In some embodiments, an End to End (E2E) connection may be established between user equipment 110. For example, Vehicle to Vehicle (V2V) communication, Vehicle to Infrastructure (V2I) communication and Vehicle to Pedestrian (V2P) communication in Vehicle to everything (V2X) communication and so on.

Here, the above user equipment may be regarded as the terminal device in the following embodiments.

In some embodiments, the foregoing wireless communication system may further include a network management device 130.

Several base stations 120 are connected to the network management device 130 respectively. The network management device 130 may be a core network device in the wireless communication system. For example, the network management device 130 may be a Mobility Management Entity (MME). Alternatively, the network management device may be other core network device, such as a Serving GateWay (SGW), a Public Data Network GateWay (PGW), a Policy and Charging Rules Function (PCRF) or Home Subscriber Server (HSS), etc. The implementation form of the network management device 130 is not limited in the embodiments of the present disclosure.

In order to facilitate the understanding of those skilled in the art, the embodiments of the present disclosure list a plurality of implementations to clearly illustrate the technical solutions of the embodiments of the present disclosure. Of course, those skilled in the art can understand that the plurality of implementations provided by the embodiments of the present disclosure may be performed independently, or combined with methods of other embodiments among embodiments of the present disclosure, or an implementation performed independently or implementations performed with other embodiments may be performed in combination with some methods in other related technologies; the embodiments of the present disclosure do not limit this.

In order to better understand the technical solutions described in any embodiment of the present disclosure, first, a ranging scenario in the related art is explained below.

Figure 2:
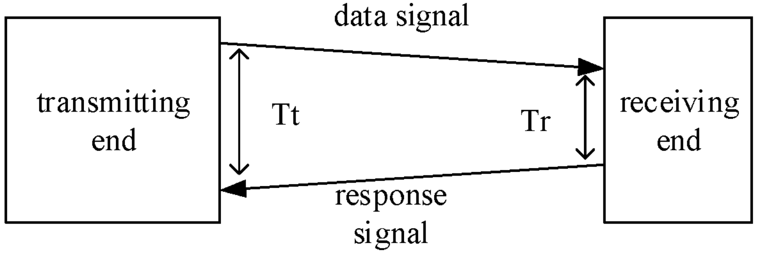
FIG. 2 is a schematic diagram of a ranging method according to an exemplary embodiment.

Referring to FIG. 2, a ToF ranging method is a two-way ranging technology that uses flight time of a data signal back and forth between a transmitting end and a receiving end to measure the distance between two points. A time interval between sending of the data signal by the transmitting end and receiving of a response signal from the receiving end is marked as Tt. A time interval between receiving of the data signal by the receiving from the transmitting end and sending of the response signal is marked as Tr. The one-way flight time of the signal between the transmitting end and the receiving end is $Tf=(Tt-Tr)/2$, and the distance between the two points is d, and $d=c*Tf$, where c represents the electromagnetic wave propagation speed.

In an embodiment, during a discovery procedure of a positioning device, a first message sent from a discovering device includes positioning requirement information, and a second message sent from a discovered device provides positioning information. The positioning information is used for the discovering device to determine position information between two devices. Since the discovery procedure needs to be in plaintext, information transmitted between devices is vulnerable to interception and abuse.

In an embodiment, in order to ensure device information security and measurement reliability, an inter-device position measurement procedure is divided into three steps: device discovery, authentication and authorization, and measurement. This procedure solves the problem of information security, but in public places that require frequent ranging, this method brings a lot of signaling burden and increases the delay.

Figure 3:
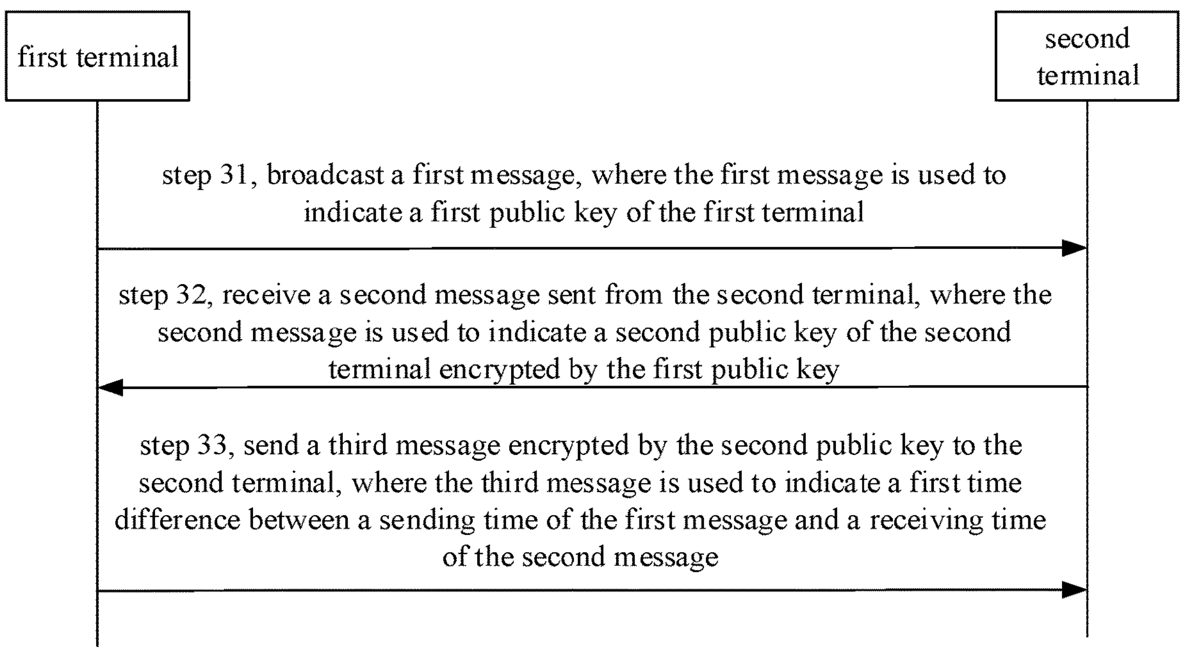
FIG. 3 is a schematic flowchart of a ranging method according to an exemplary embodiment.

As shown in FIG. 3, a ranging method is provided in an embodiment. The method is performed by a first terminal, and the method includes:

In step 31, a first message is broadcast, where the first message is used to indicate a first public key of the first terminal.

In step 32, a second message sent from a second terminal is received. The second message is used to indicate a second public key of the second terminal encrypted by the first public key.

In step 33, a third message encrypted by the second public key is sent to the second terminal. The third message is used to indicate a first time difference between a sending time of the first message and a receiving time of the second message.

Here, the first terminal and the second terminal may be, but not limited to, mobile phones, wearable devices, vehicle-mounted terminals, Road Side Units (RSUs), smart home terminals, industrial sensing devices and/or medical devices, and so on.

In an embodiment, the first message may be broadcast periodically. Here, the period for broadcasting the first message may be determined based on a delay requirement for ranging. In an embodiment, in response to the delay requirement for ranging being greater than a delay threshold, it is determined that the period for broadcasting the first message is greater than a period threshold. In response to the delay requirement for ranging being less than the delay threshold, it is determined that the period for broadcasting the first message is less than the period threshold. In this way, the period for broadcasting the first message may be adapted to the delay requirement for ranging.

In an embodiment, the first terminal may send the first message in a broadcast manner. In an embodiment, the second terminal may receive first messages sent from multiple first terminals in a broadcast manner. After receiving first messages sent from the multiple first terminal in a broadcast manner, the second terminal may discard part of the received first messages. In an embodiment, when a terminal sending a first message is not a terminal preset by the second terminal, the second terminal discards the first message sent from the terminal. In another embodiment, when a terminal sending a first message is a terminal preset by the second terminal and is not a terminal that is required to be connected for ranging, the second terminal discards the first message sent from the terminal.

In an embodiment, a secret key of the first terminal includes a first public key and a first private key. After receiving information encrypted by the second terminal using the first public key, the first terminal may use the first private key to decrypt the encrypted information. After receiving information encrypted by the first terminal using the first private key, the second terminal may decrypt the encrypted information using the first public key. Here, before the second terminal uses the first public key to perform decryption, the first terminal may send the first public key to the second terminal in advance. In this way, the security of information transmission between the first terminal and the second terminal can be ensured.

In an embodiment, a secret key of the second terminal includes a second public key and a second private key. After receiving information encrypted by the first terminal using the second public key, the second terminal may use the second private key to decrypt the encrypted information. After receiving the information encrypted by the second terminal using the second private key, the first terminal may decrypt the encrypted information using the second public key. Here, before the first terminal uses the second public key to perform decryption, the second terminal may send the second public key to the first terminal in advance. In this way, the security of information transmission between the first terminal and the second terminal can be ensured.

In an embodiment, the second terminal sends the second message to the first terminal in response to receiving the first message sent from the first terminal and determining that the first terminal is a preset terminal. Here, the preset terminal may be configured in a terminal set, and the terminal set includes an identity of at least one first terminal used for ranging between the first terminal and the second terminal. After receiving the first message from the first terminal, the second terminal may determine whether the identity of the first terminal carried in the first message is in the terminal set. In response to the identity of the first terminal carried in the first message being in the terminal set, the second message is sent to the first terminal.

In an embodiment, when the first terminal broadcasts the first message, the first terminal records a sending time of the first message. When the first terminal receives the second message sent from the second terminal, the first terminal records a receiving time of the second message. The first terminal determines a first time difference between the sending time and the receiving time according to the sending time and the receiving time, and sends the information of the first time difference to the second terminal through the third message.

In an embodiment, when the second terminal receives the first message sent from the first terminal, the second terminal records a receiving time of the first message. When the second terminal sends the second message to the first terminal, the second terminal records a sending time of the second message. The second terminal determines a second time difference between the sending time and the receiving time according to the receiving time and the sending time. After receiving the first time difference sent from the first terminal, the second terminal determines a difference between the first time difference and the second time difference, and determines the distance between the first terminal and the second terminal based on the difference and the electromagnetic wave propagation speed.

In an embodiment, the second terminal may determine the distance between the first terminal and the second terminal by using an average value of distances measured within a predetermined period of time. In this way, the measurement accuracy of the distance between the first terminal and the second terminal can be improved. In an embodiment, the duration of the predetermined period of time is determined based on the required measurement accuracy. In an embodiment, in response to the required measurement accuracy being greater than or equal to an accuracy threshold, it is determined that the duration of the predetermined period of time is greater than a duration threshold. Alternatively, in response to the required measurement accuracy being less than the accuracy threshold, it is determined that the duration of the predetermined period of time is less than or equal to the duration threshold.

In an embodiment, using the second public key to encrypt the third message may be to use the second public key to encrypt information such as the first time difference and the identity of the first terminal in the third message. In response to receiving the third message and being unable to decrypt the third message using the second private key, the second terminal may discard the third message after receiving the third message. In this way, the security of data transmission between the first terminal and the second terminal can be ensured.

In an embodiment, the first terminal sends the third message to the second terminal in response to receiving the second message sent from the second terminal and determining that the first message and/or the second message is not replayed.

In an embodiment, the second terminal sends the second message to the first terminal in response to receiving the first message sent from the first terminal and determining that the first message is not replayed.

In an embodiment, the first message indicating the first public key of the first terminal includes: the first message carrying the first public key; or the first message carrying indication information for indicating the first public key. For example, the indication information “00” indicates the first public key.

In the embodiments of the present disclosure, when measuring the distance between the first terminal and the second terminal, the first message is used to indicate the first public key; the second message is used to indicate the second public key and the second public key is encrypted by the first public key; and the third message is encrypted by the second public key. Compared with a method of using additional message(s) to carry security information to ensure security of transmission of ranging information, the technical solutions of the present disclosure carries security information in the first message and the second message used for ranging. Thus, while ensuring safe information transmission, the technical solutions can reduce the consumption of signaling resources and save the time of ranging.

It should be noted that those skilled in the art can understand that the methods provided in the embodiments of the present disclosure may be performed independently, or may be performed together with some methods in the embodiments of the present disclosure or some methods in related art.

Figure 4:
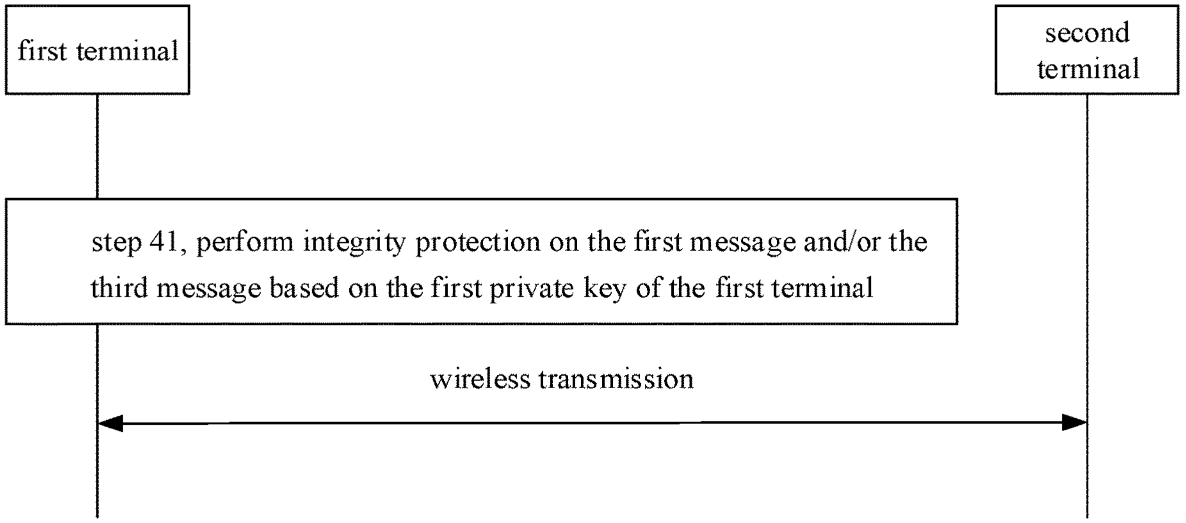
FIG. 4 is a schematic flowchart of a ranging method according to an exemplary embodiment.

As shown in FIG. 4, a ranging method is provided in an embodiment. The method is performed by the first terminal, and the method includes:

In step 41, integrity protection is performed on the first message and/or the third message based on the first private key of the first terminal.

In an embodiment, the first terminal uses a predetermined integrity protection algorithm and uses at least one of the secret key, the message itself, and the length of the message as an input parameter to calculate a first verification code including multiple bits, and carry the first verification code in an information field of the first message and/or the third message. After receiving the first message and/or the third message, the second terminal calculates a second verification code of the first message and/or the third message in the same calculation method, and compares the first verification code with the second verification code to determine whether the integrity protection check is successful. If the first verification code is the same as the second verification code, the second terminal determines that the check of the integrity protection succeeds; otherwise, the second terminal determines that the check of the integrity protection fails.

In an embodiment, the second terminal discards the first message after receiving the first message in response to that the check of the integrity protection of the first message fails. In another embodiment, the second terminal discards the third message after receiving the third message in response to that the check of the integrity protection of the third message fails.

It should be noted that those skilled in the art can understand that the methods provided in the embodiments of the present disclosure may be performed independently, or may be performed together with some methods in the embodiments of the present disclosure or some methods in related art.

Figures 5, 6, 7:
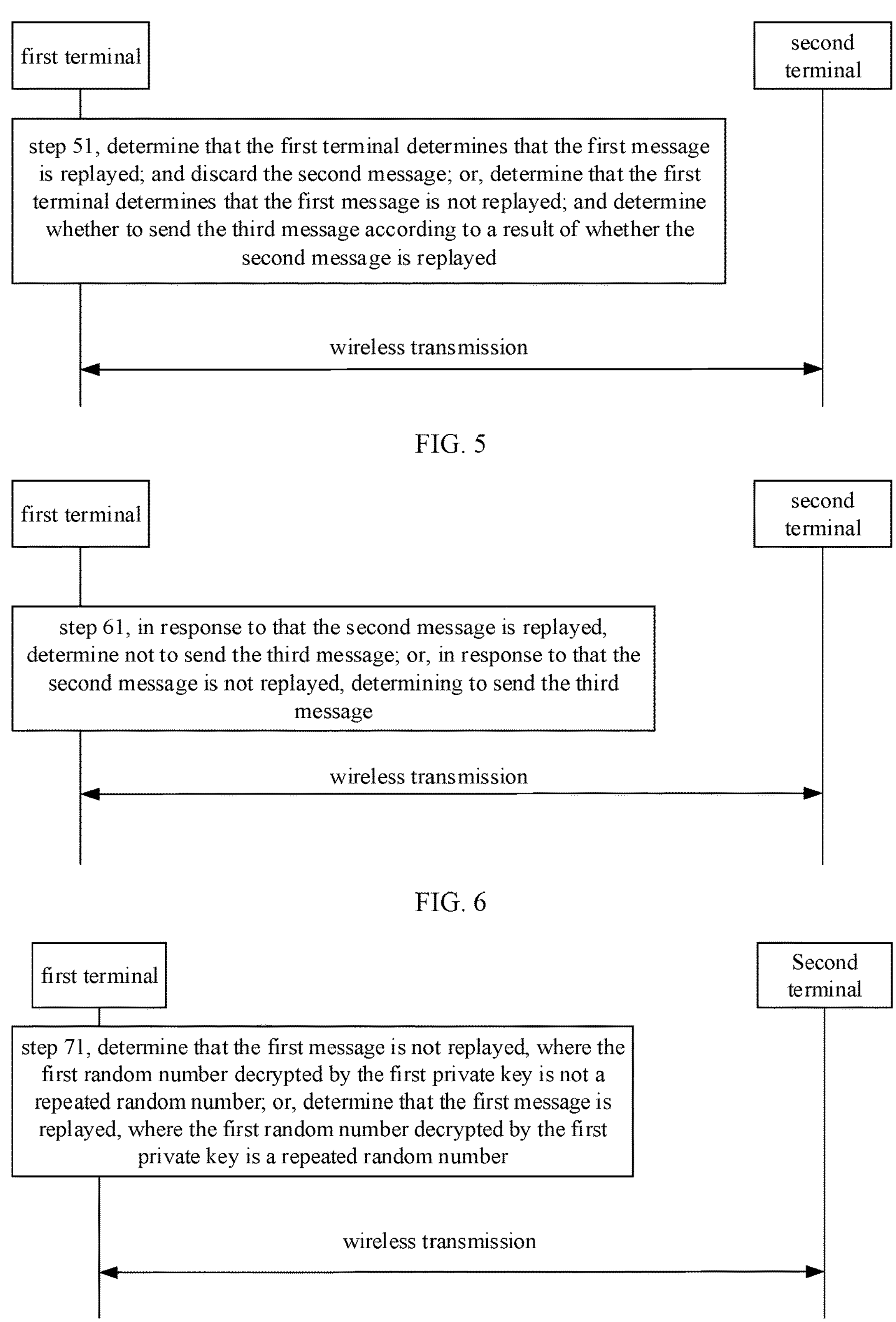
FIG. 5 is a schematic flowchart of a ranging method according to an exemplary embodiment.
FIG. 6 is a schematic flowchart of a ranging method according to an exemplary embodiment.
FIG. 7 is a schematic flowchart of a ranging method according to an exemplary embodiment.

As shown in FIG. 5, a ranging method is provided in an embodiment. The method is performed by a first terminal, and the method includes:

In step 51, it is determined that the first terminal determines that the first message is replayed; and the second message is discarded; or it is determined that the first terminal determines that the first message is not replayed; and whether to send the third message is determined according to a result of whether the second message is replayed.

In an embodiment, the first message being replayed may be that a third terminal broadcasts the first message after obtaining the first message. The third terminal is different from the first terminal.

In an embodiment, the first message carries an encrypted first random number, where the first random number is generated by the first terminal. After the second terminal receives the first message carrying the first random number, if the second terminal receives the first message carrying the first random number again, it determines that the first message is replayed. It should be noted that the second terminal may send to the first terminal a message indicating that the first message is replayed.

In an embodiment, the first message carries an encrypted first random number, where the first random number is generated by the first terminal. After the second terminal receives the first message carrying the first random number, it sends a second message carrying the first random number to the first terminal. After the first terminal receives the second message carrying the first random number, if the first terminal receives the second message carrying the first random number again, it is determined that the first message is replayed.

In an embodiment, the second message carries an encrypted second random number, where the second random number is generated by the second terminal. After the first terminal receives the second message carrying the second random number, if the first terminal receives the second message carrying the second random number again, it is determined that the second message is replayed.

In an embodiment, in response to the second message being replayed, it is determined not to send the third message. Alternatively, in response to the second message not being replayed, it is determined to send the third message.

In an embodiment, in response to determining that the first message is replayed, the second message is discarded and the first terminal does not send the third message to the second terminal.

It should be noted that those skilled in the art can understand that the methods provided in the embodiments of the present disclosure may be performed independently, or may be performed together with some methods in the embodiments of the present disclosure or some methods in related art.

As shown in FIG. 6, a ranging method is provided in an embodiment. The method is performed by a first terminal, and the method includes:

In step 61, it is determined that the second message is replayed; and it is determined not to send the third message; or it is determined that the second message is not replayed; and it is determined to send the third message.

In an embodiment, the second message carries an encrypted second random number, where the second random number is generated by the second terminal. After the first terminal receives the second message carrying the second random number, if the first terminal receives the second message carrying the second random number again, it is determined that the second message is replayed.

It should be noted that those skilled in the art can understand that the methods provided in the embodiments of the present disclosure may be performed independently, or may be performed together with some methods in the embodiments of the present disclosure or some methods in related art.

In an embodiment, the first message is further used to indicate at least one of the following:

an identity (ID) of the first terminal;

a first random number generated by the first terminal, where the first random number is used to determine whether the first message is replayed; here, the first random number may be encrypted based on the first public key; or a command ID of the first message.

In an embodiment, after the second terminal receives the first message sent from the first terminal, the second terminal determines whether the identity carried in the first message is a predetermined identity; in response to the identity being the predetermined identity, the second terminal sends the second message to the first terminal after receiving the first message. In response to the identity not being the predetermined identity, the second terminal discards the first message after receiving the first message, and does not send the second message to the first terminal.

In an embodiment, the second terminal sends the second message to the first terminal in response to receiving the first message sent from the first terminal and determining that the first terminal is a predetermined terminal. Here, the predetermined terminal may be configured in a terminal set, and the terminal set includes an identity of at least one first terminal used for ranging between the first terminal and the second terminal. After receiving the first message from the first terminal, the second terminal may determine whether the identity of the first terminal carried in the first message is in the terminal set. In response to the identity of the first terminal carried in the first message being in the terminal set, the second terminal sends the second message to the first terminal.

In an embodiment, the first message carries a first random number encrypted based on the first public key, where the first random number is generated by the first terminal. After the second terminal receives the first message carrying the first random number, the second terminal sends a second message carrying the first random number to the first terminal. After the first terminal receives the second message carrying the first random number, if the first terminal receives the second message carrying the first random number again, it is determined that the first message is replayed. In response to the first message being replayed, the first terminal discards the second message after receiving the second message.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure may be performed independently, or may be performed together with some methods in the embodiments of the present disclosure or some methods in related art.

In an embodiment, the second message is further used to indicate at least one of the following:

- an application ID encrypted by the first public key, where the application ID is used to trigger the second terminal to send the second message;
- a first random number generated by the first terminal, where the first random number is used to determine whether the first message is replayed; here, the first random number is encrypted based on the first public key;
- a second random number generated by the second terminal, where the second random number is used to determine whether the second message is replayed; here, the second random number is encrypted based on the first public key; or
- a command ID of the first message.

In an embodiment, different ranging applications may be run in the second terminal, where application IDs of different ranging applications are different. A different application ID may indicate that the first terminal sends to the second terminal a third message containing different information. Here, third messages of different information may be third messages containing information of different formats, quantities, types, etc.

In an embodiment, the first message carries an encrypted first random number, where the first random number is generated by the first terminal. After the second terminal receives the first message carrying the first random number, if the second terminal receives the first message carrying the first random number again, it determines that the first message is replayed.

In an embodiment, the first message carries an encrypted first random number, where the first random number is generated by the first terminal. After the second terminal receives the first message carrying the first random number, the second terminal sends a second message carrying the first random number to the first terminal. After the first terminal receives the second message carrying the first random number, if the first terminal receives the second message carrying the first random number again, it is determined that the first message is replayed.

In an embodiment, the second message carries an encrypted second random number, where the second random number is generated by the second terminal. After the first terminal receives the second message carrying the second random number, if the first terminal receives the second message carrying the second random number again, it is determined that the second message is replayed.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure can be performed independently, or may be performed together with some methods in the embodiments of the present disclosure or some methods in related art.

As shown in FIG. 7, a ranging method is provided in an embodiment. The method is performed by a first terminal, and the second message indicates the first random number encrypted by the first public key. The method includes:

In step 71, it is determined that the first message is not replayed, where the first random number decrypted by the first private key is not a repeated random number; or it is determined that the first message is replayed, where the first random number decrypted by the first private key is a repeated random number.

In an embodiment, the first message carries a first random number encrypted by a first public key, where the first random number is generated by the first terminal. After receiving the first message carrying the first random number, the second terminal sends the second message carrying the first random number to the first terminal, where the first random number is encrypted using a first private key. After the first terminal receives the second message carrying the first random number, if the first terminal receives the second message carrying the first random number again, it is determined that the first message is replayed. Here, the first random number may be decrypted using the first private key of the first terminal.

In an embodiment, the first message carries a first random number encrypted using the first public key, where the first random number is generated by the first terminal. After the second terminal receives the first message carrying the first random number, the second terminal sends the second message carrying the first random number to the first terminal, where the first random number is encrypted using the first private key. After the first terminal receives the second message carrying the first random number, if the first terminal does not receive the second message carrying the first random number, it is determined that the first message is not replayed. Here, the first random number may be decrypted using the first private key of the first terminal.

It should be noted that those skilled in the art can understand that the methods provided in the embodiments of the present disclosure may be performed independently, or may be performed together with some methods in the embodiments of the present disclosure or some methods in related art.

Figure 8:
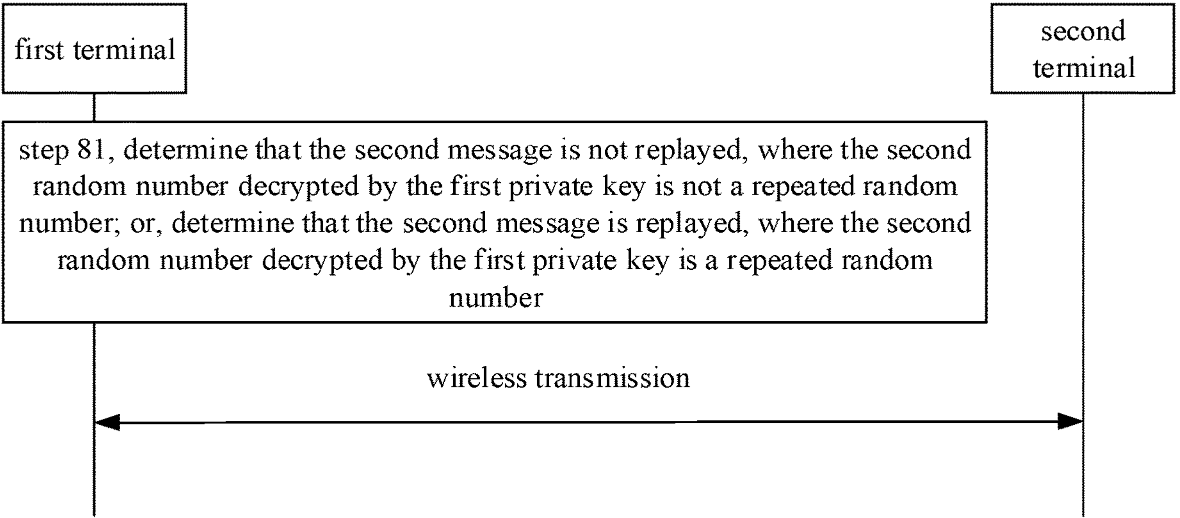
FIG. 8 is a schematic flowchart of a ranging method according to an exemplary embodiment.

As show in FIG. 8, a ranging method is provided in an embodiment. The second message indicates a second random number encrypted by the first public key. The method includes:

In step 81, it is determined that the second message is not replayed, where the second random number decrypted by the first private key is not a repeated random number; or it is determined that the second message is replayed, where the second random number decrypted by the first private key is a repeated random number.

In an embodiment, the second message carries an encrypted second random number, where the second random number is generated by the second terminal. After the first terminal receives the second message carrying the second random number, if the first terminal receives the second message carrying the second random number again, it is determined that the second message is replayed.

In an embodiment, the second message carries an encrypted second random number, where the second random number is generated by the second terminal. After the first terminal receives the second message carrying the second random number, if the first terminal does not receive the second message carrying the second random number again, it is determined that the second message is not replayed.

It should be noted that those skilled in the art can understand that the methods provided in the embodiments of the present disclosure may be performed independently, or may be performed together with some methods in the embodiments of the present disclosure or some methods in related art.

Figure 9:
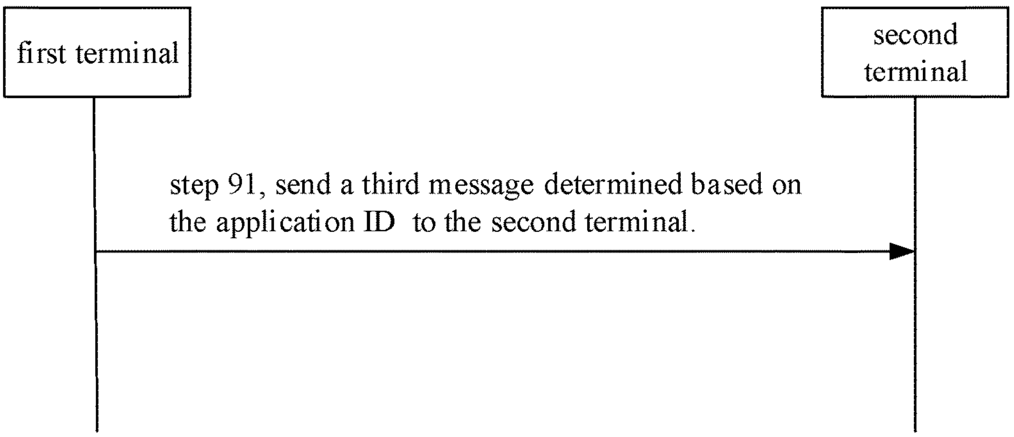
FIG. 9 is a schematic flowchart of a ranging method according to an exemplary embodiment.

As shown in FIG. 9, a ranging method is provided in an embodiment. The second message indicates the application ID. The method includes:

In step 91, a third message determined based on the application ID is sent to the second terminal.

In an embodiment, different ranging applications may run in the second terminal, where application IDs of the different ranging applications are different. A different application ID may indicate that the first terminal sends to the second terminal a third message containing different information. Here, third messages of different information may be third messages containing information of different formats, quantities, types, etc.

In an embodiment, in response to receiving the second message sent from the second terminal, the third message determined based on the application ID is sent to the second terminal.

It should be noted that those skilled in the art can understand that the methods provided in the embodiments of the present disclosure may be performed independently, or may be performed together with some methods in the embodiments of the present disclosure or some methods in related art.

In an embodiment, the third message is further used to indicate at least one of the following:

an ID of the first terminal;

a third random number generated by the first terminal, where the third random number is used to determine whether the third message is replayed; here, the third random number is encrypted based on the second public key; or a command ID of the first message.

In an embodiment, after receiving the first message sent from the first terminal, the second terminal determines whether the identity carried in the first message is a predetermined identity. In response to the identity being the predetermined identity, the second terminal sends the second message to the first terminal after receiving the first message. In response to the identity identifier not being the predetermined identity, the second terminal discards the first message after receiving the first message and does not send the second message to the first terminal.

In an embodiment, the second terminal sends the second message to the first terminal in response to receiving the first message sent from the first terminal and determining that the first terminal is a predetermined terminal. Here, the predetermined terminal may be configured in a terminal set, and the terminal set includes an identity of at least one first terminal used for distance measurement between the first terminal and the second terminal. After receiving the first message from the first terminal, the second terminal may determine whether the identity of the first terminal carried in the first message is in the terminal set. In response to the identity of the first terminal carried in the first message being in the terminal set, the second message is sent to the first terminal.

In an embodiment, the third message carries a third random number encrypted by the second public key, where the third random number is generated by the first terminal. After the second terminal receives the first message carrying the third random number, if the second terminal receives the third message carrying the third random number again, it is determined that the third message is replayed.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure may be performed independently, or may be performed together with some methods in the embodiments of the present disclosure or some methods in related art.

Figure 10:
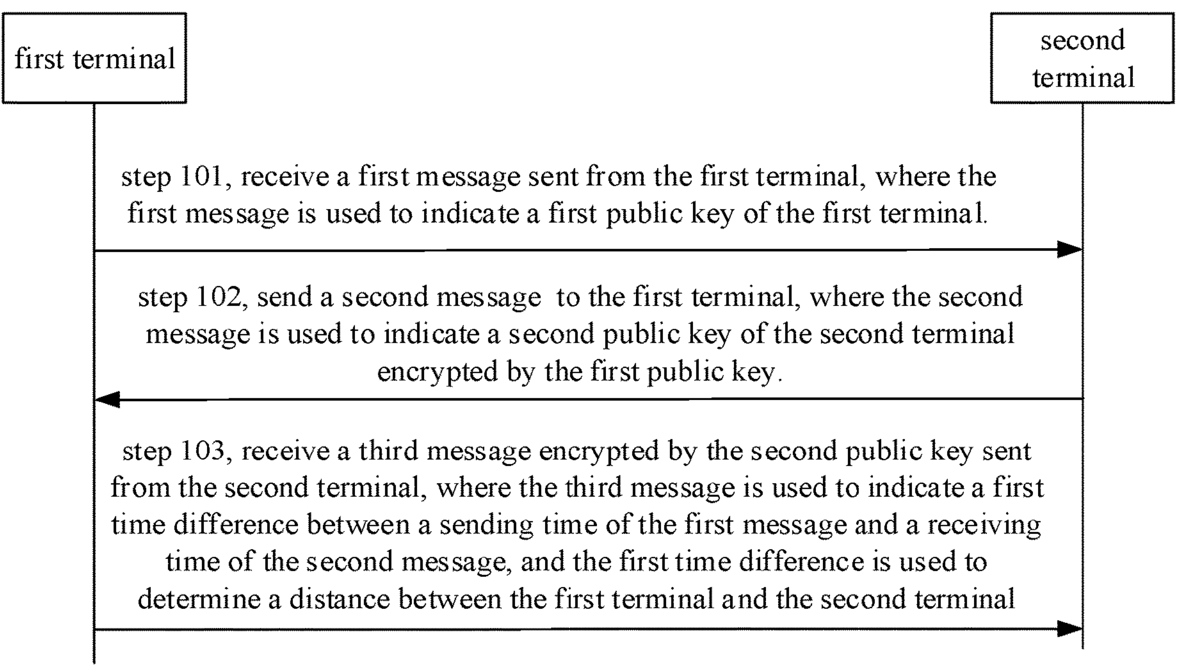
FIG. 10 is a schematic flowchart of a ranging method according to an exemplary embodiment.

As shown in FIG. 10, a ranging method is provided in an embodiment. The method is performed by a second terminal. The method includes:

In step 101, a first message sent from a first terminal is received, where the first message is used to indicate a first public key of the first terminal.

In step 102, a second message is sent to the first terminal, where the second message is used to indicate a second public key of the second terminal encrypted by the first public key.

In step 103, a third message encrypted by the second public key sent from the second terminal is received. The third message is used to indicate a first time difference between a sending time of the first message and a receiving time of the second message. The first time difference is used to determine a distance between the first terminal and the second terminal.

Here, the first terminal and the second terminal may be, but not limited to, mobile phones, wearable devices, vehicle-mounted terminals, Road Side Units (RSUs), smart home terminals, industrial sensing devices and/or medical devices, and so on.

In an embodiment, the first message may be broadcast periodically. Here, a period for broadcasting the first message may be determined according to a delay requirement for ranging. In an embodiment, in response to the delay requirement for ranging being greater than a delay threshold, it is determined that the period for broadcasting the first message is greater than a period threshold. In response to the delay requirement for ranging being less than the delay threshold, it is determined that the period for broadcasting the first message is less than the period threshold. In this way, the period for broadcasting the first message can be adapted to the delay requirement for ranging.

In an embodiment, the first terminal may send the first message in a broadcast manner. In an embodiment, the second terminal may receive first messages sent from multiple first terminals in a broadcast manner. After receiving the first messages sent from multiple first terminals in a broadcast manner, the second terminal may discard part of the received first messages. In an embodiment, when a terminal that sends a first message is not a terminal preset by the second terminal, the second terminal discards the first message sent from the terminal. In another embodiment, when a terminal that sends a first message is a terminal preset by the second terminal and is not a terminal that is required to be connected for ranging, the second terminal discards the first message sent from the terminal.

In an embodiment, a secret key of the first terminal includes a first public key and a first private key. After receiving information encrypted by the second terminal using the first public key, the first terminal may use the first private key to decrypt the encrypted information. After receiving information encrypted by the first terminal using the first private key, the second terminal may use the first public key to decrypt the encrypted information. Here, before the second terminal uses the first public key to perform decryption, the first terminal may send the first public key to the second terminal in advance. In this way, the security of information transmission between the first terminal and the second terminal can be ensured.

In an embodiment, a secret key of the second terminal includes a second public key and a second private key. After receiving information encrypted by the first terminal using the second public key, the second terminal may use the second private key to decrypt the encrypted information. After receiving information encrypted by the second terminal using the second private key, the first terminal may decrypt the encrypted information using the second public key. Here, before the first terminal uses the second public key to perform decryption, the second terminal may send the second public key to the first terminal in advance. In this way, the security of information transmission between the first terminal and the second terminal can be ensured.

In an embodiment, the second terminal sends the second message to the first terminal in response to receiving the first message sent from the first terminal and determining that the first terminal is a preset terminal. Here, the preset terminal may be configured in a terminal set, and the terminal set includes an identity of at least one first terminal used for ranging between the first terminal and the second terminal. After receiving the first message from the first terminal, the second terminal may determine whether the identity of the first terminal carried in the first message is in the terminal set. In response to the identity of the first terminal carried in the first message being in the terminal set, the second message is sent to the first terminal.

In an embodiment, when the first terminal broadcasts the first message, the first terminal records a sending time of the first message. When the first terminal receives the second message sent from the second terminal, the first terminal records a receiving time of the second message. The first terminal determines a first time difference between the sending time and the receiving time according to the sending time and the receiving time, and sends information of the first time difference to the second terminal through the third message.

In an embodiment, when the second terminal receives the first message sent from the first terminal, the second terminal records a receiving time of the first message. When the second terminal sends the second message to the first terminal, the second terminal records a sending time of the second message. The second terminal determines a second time difference between the sending time and the receiving time according to the receiving time and the sending time. After receiving the first time difference sent from the first terminal, the second terminal determines a difference between the first time difference and the second time difference, and determines the distance between the first terminal and the second terminal based on the difference and the electromagnetic wave propagation speed.

In an embodiment, the second terminal may determine the distance between the first terminal and the second terminal through an average of measured distances within a predetermined period of time. In this way, the measurement accuracy of the distance between the first terminal and the second terminal can be improved. In an embodiment, the duration of the predetermined period of time is determined based on the required measurement accuracy. In an embodiment, in response to the required measurement accuracy being be greater than or equal to an accuracy threshold, it is determined that the duration of the predetermined period of time is greater than a duration threshold. Alternatively, in response to the required measurement accuracy being less than the accuracy threshold, it is determined that the duration of the predetermined period of time is less than or equal to the duration threshold.

In an embodiment, using the second public key to encrypt the third message may include using the second public key to encrypt information such as the first time difference and the identity of the first terminal in the third message. In response to receiving the third message and being unable to decrypt the third message using the second private key, the second terminal may discard the third message after receiving the third message. In this way, the security of data transmission between the first terminal and the second terminal can be ensured.

In an embodiment, the first terminal sends the third message to the second terminal in response to receiving the second message sent from the second terminal and determining that the first message and/or the second message is not replayed.

In an embodiment, the second terminal sends the second message to the first terminal in response to receiving the first message sent from the first terminal and determining that the first message is not replayed.

In an embodiment, the first message indicating the first public key of the first terminal includes: the first message carrying the first public key; or, the first message carrying indication information indicating the first public key. For example, indication information "00" indicates the first public key.

In the embodiments of the present disclosure, when performing ranging between the first terminal and the second terminal, the first message is used to indicate the first public key; the second message is used to indicate the second public key and the second public key is encrypted by the first public key; and the third message is encrypted by the second public key. Compared with a method of using an additional message to carry security information to ensure the security of transmission of ranging information, the technical solutions of the present disclosure carries security information in the first message and the second message used for ranging, and thus while ensuring safe information transmission, the technical solutions of the present disclosure can reduce the consumption of signaling resources and save ranging time.

It should be noted that those skilled in the art can understand that the methods provided in the embodiments of the present disclosure may be performed independently, or may be performed together with some methods in the embodiments of the present disclosure or some methods in related art.

Figure 11:
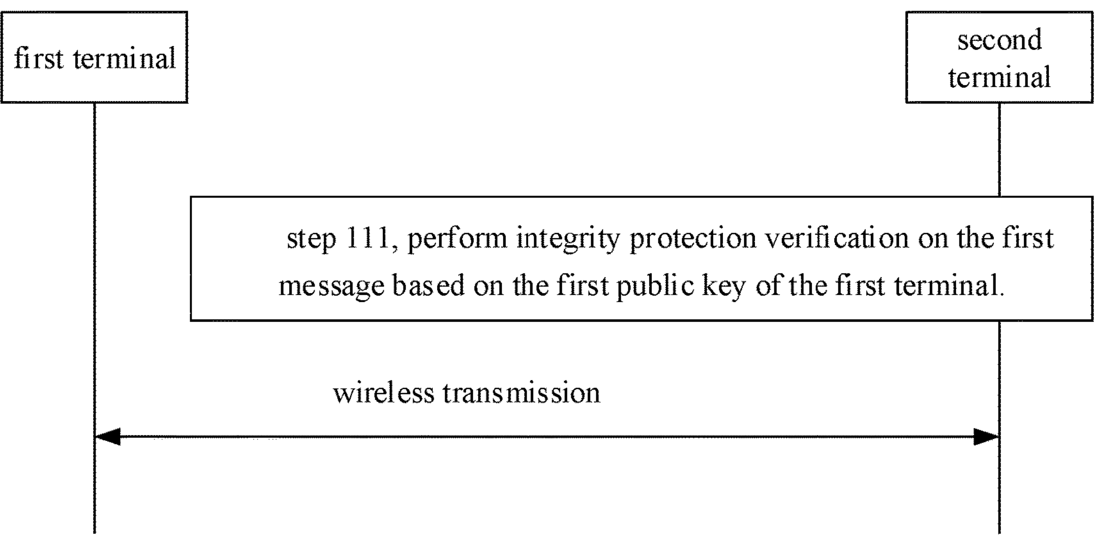
FIG. 11 is a schematic flowchart of a ranging method according to an exemplary embodiment.

As shown in FIG. 11, a ranging method is provided in an embodiment. The method is performed by a second terminal. The method includes:

In step 111, integrity protection verification is performed on the first message based on the first public key of the first terminal.

In an embodiment, the first terminal uses a predetermined integrity protection algorithm with at least one of the first private key, the message itself, and the length of the message and so on as an input parameter to calculate a first verification code containing a plurality of bits, and carries the first verification code in an information field of the first message. After receiving the first message, the second terminal calculates a second verification code of the first message based on the first public key using the same calculation method, and determines whether the integrity protection verification is successful by comparing the first verification code and the second verification code; if the first verification code is the same as the second verification code, the second terminal determines that the integrity protection verification is successful; otherwise, the second terminal determines that the integrity protection verification fails.

In an embodiment, the second terminal discards the first message after receiving the first message in response to that the integrity protection verification of the first message fails.

It should be noted that those skilled in the art can understand that the methods provided in the embodiments of the present disclosure may be performed independently, or may be performed together with some methods in the embodiments of the present disclosure or some methods in related art.

Figure 12:
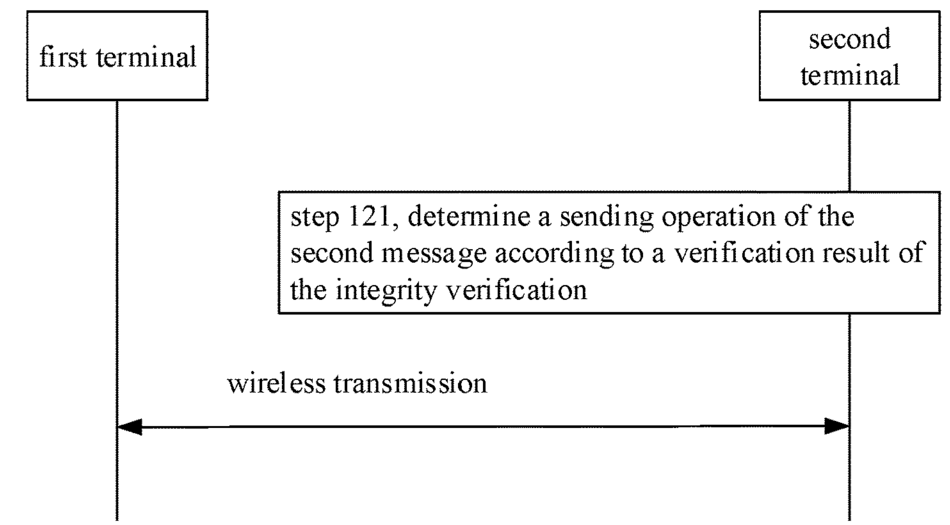
FIG. 12 is a schematic flowchart of a ranging method according to an exemplary embodiment.

As shown in FIG. 12, a ranging method is provided in an embodiment. The method is performed by a second terminal. The method includes:

In step 121, whether to send the second message is determined according to a result of the integrity verification.

In an embodiment, it is determined that the result indicates successful verification; and it is determined to send the second message.

In an embodiment, it is determined that the result indicates failed verification; and it is determined to discard the first message and not to send the second message.

In an embodiment, the first terminal uses a predetermined integrity protection algorithm with at least one of the key, the message itself, the length of the message and so on as an input parameter to calculate a first verification code containing a plurality of bits, and carries the first verification code in an information field of the first message. After receiving the first message, the second terminal calculates a second verification code of the first message using the same calculation method, and determines whether the integrity protection verification is successful by comparing the first verification code and the second verification code. If the first verification code is the same as the second verification code, the second terminal determines that the integrity protection verification is successful, that is, the verification result indicates that the verification is successful; otherwise, it is determined that the integrity protection verification fails, that is, the verification result indicates that the verification fails.

It should be noted that those skilled in the art can understand that the methods provided in the embodiments of the present disclosure may be performed independently, or may be performed together with some methods in the embodiments of the present disclosure or some methods in related art.

An embodiment provides a ranging method, where the method is performed by a second terminal. The method includes:

determining that the result indicates successful verification; and determining to send the second message; or determining that the result indicates failed verification; and determining to discard the first message and not to send the second message.

Figure 13:
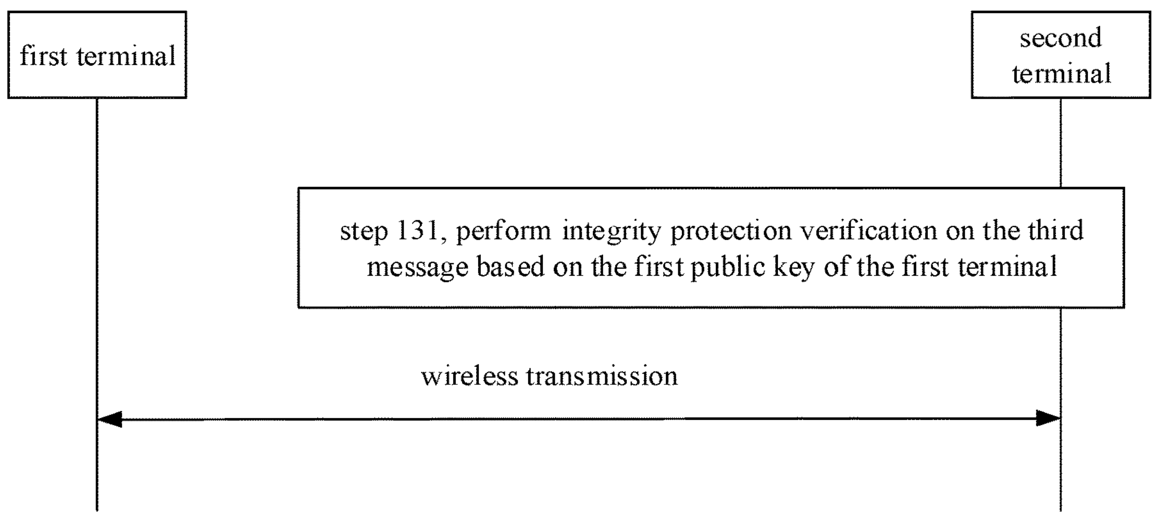
FIG. 13 is a schematic flowchart of a ranging method according to an exemplary embodiment.

As shown in FIG. 13, a ranging method is provided in an embodiment. The method is performed by a second terminal. The method includes:

In step 131, integrity protection verification is performed on the third message based on the first public key of the first terminal.

In an embodiment, the first terminal uses a predetermined integrity protection algorithm with at least one of the first private key, the message itself, and the length of the message and so on as an input parameter to calculate a first verification code containing a plurality of bits, and carry the first verification code in an information field of the third message. After receiving the third message, the second terminal calculates a second verification code of the third message with the same calculation method based on the first public key, and determines whether the integrity protection verification is successful by comparing the first verification code with the second verification code. If the first verification code is the same as the second verification code, the second terminal determines that the integrity protection verification is successful; otherwise, the first terminal determines that the integrity protection verification fails.

In an embodiment, the second terminal discards the third message after receiving the third message in response to that the integrity protection verification of the third message fails.

It should be noted that those skilled in the art can understand that the methods provided in the embodiments of the present disclosure may be performed independently, or may be performed together with some methods in the embodiments of the present disclosure or some methods in related art.

In an embodiment, the third message further indicates one or more of the following information:

an ID of the first terminal;

a third random number generated by the first terminal, where the third random number is used to determine whether the third message is replayed; here, the third random number is encrypted based on the second public key; or a command ID of the first message.

In an embodiment, after receiving the first message sent from the first terminal, the second terminal determines whether an identity carried in the first message is a predetermined identity; in response to that the identity is the predetermined identity, the second terminal sends the second message to the first terminal after receiving the first message. In response to the fact that the identity is not the predetermined identity, the second terminal discards the first message after receiving the first message and does not send the second message to the first terminal.

In an embodiment, the second terminal sends the second message to the first terminal in response to receiving the first message sent from the first terminal and determining that the first terminal is the predetermined terminal. Here, the predetermined terminal may be configured in a terminal set, and the terminal set includes an identity of at least one first terminal used for distance measurement between the first terminal and the second terminal. After receiving the first message from the first terminal, the second terminal may determine whether the identity of the first terminal carried in the first message is in the terminal set. In response to the identity of the first terminal carried in the first message being in the terminal set, the second message is sent to the first terminal.

In an embodiment, the third message carries a third random number encrypted by the second public key, where the third random number is generated by the first terminal. After the second terminal receives the first message carrying the third random number, if the second terminal receives the third message carrying the third random number again, the second terminal determines that the third message is replayed.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure may be performed independently, or may be performed together with some methods in the embodiments of the present disclosure or some methods in related art.

Figure 14:
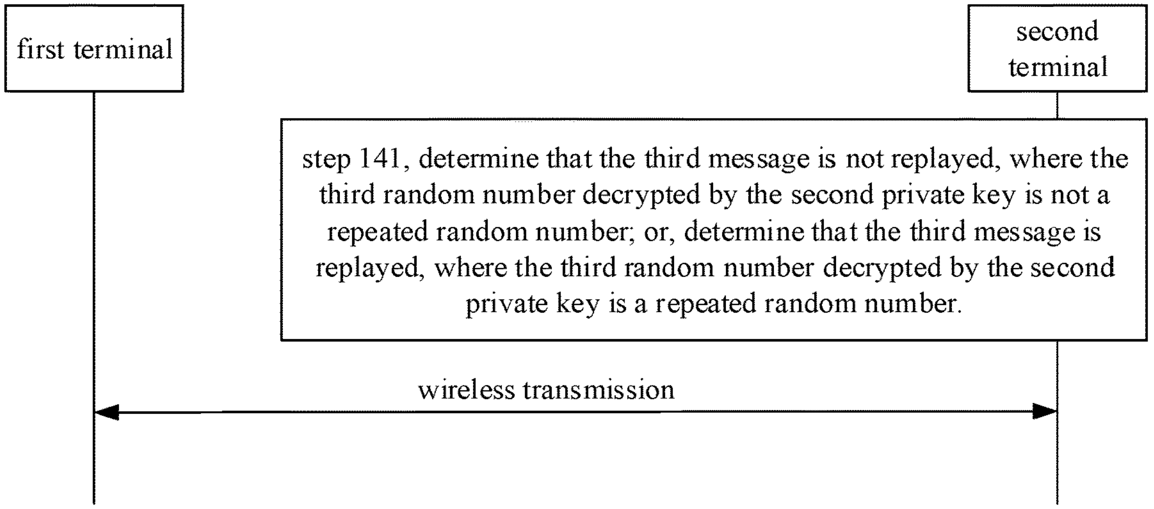
FIG. 14 is a schematic flowchart of a ranging method according to an exemplary embodiment.

As shown in FIG. 14, a ranging method is provided in an embodiment. The method is performed by a second terminal, and the third message indicates the third random number encrypted by the second public key. The method includes:

In step 141, it is determined that the third message is not replayed, where the third random number decrypted by the second private key is not a repeated random number; or it is determined that the third message is replayed, where the third random number decrypted by the second private key is a repeated random number.

In an embodiment, the third message carries an encrypted third random number, where the third random number is generated by the first terminal. After the second terminal receives the third message carrying the third random number, if the second terminal receives the third message carrying the third random number again, it is determined that the third message is replayed.

In an embodiment, the third message carries an encrypted third random number, where the third random number is generated by the first terminal. After the second terminal receives the third message carrying the third random number, if the second terminal does not receive the third message carrying the third random number again, it is determined that the third message is not replayed.

It should be noted that those skilled in the art can understand that the methods provided in the embodiments of the present disclosure may be performed independently, or may be performed together with some methods in the embodiments of the present disclosure or some methods in related art.

As shown in FIG. 15, a ranging method is provided in an embodiment. The method is performed by a second terminal, and the third message indicates the ID of the first terminal. The method includes:

In step 151, it is determined that a result of the integrity protection verification of the third message indicates successful verification and the third message is not replayed; and whether to measure the distance between the first terminal and the second terminal is determined according to the ID of the first terminal.

In an embodiment, in response to the ID of the first terminal being the predetermined ID, it is determined to measure the distance between the first terminal and the second terminal. Alternatively, in response to the ID of the first terminal not being the predetermined ID, it is determined not to measure the distance between the first terminal and the second terminal.

In an embodiment, the predetermined ID may be configured in a terminal set, and the terminal set includes an identity of at least one first terminal used for ranging between the first terminal and the second terminal. After receiving the third message from the first terminal, the second terminal may determine whether the ID of the first terminal carried in the third message is in the terminal set. In response to that the ID of the first terminal carried in the third message is in the terminal set, it is determined to measure the distance between the first terminal and the second terminal.

It should be noted that those skilled in the art can understand that the methods provided in the embodiments of the present disclosure may be performed independently, or may be performed together with some methods in the embodiments of the present disclosure or some methods in related art.

As shown in FIG. 16, a ranging method is provided in an embodiment. The method is performed by a second terminal. The method includes:

In step 161, it is determined that the ID of the first terminal is a predetermined ID, and it is determined to measure the distance between the first terminal and the second terminal; or, it is determined that the ID of the first terminal is not the predetermined ID, and it is determined not to measure the distance between the first terminal and the second terminal.

In an embodiment, the predetermined ID may be configured in a terminal set. The terminal set includes at least one predetermined ID of at least one first terminal used for ranging between the first terminal and the second terminal. After receiving the third message from the first terminal, the second terminal may determine whether the ID of the first terminal carried in the third message is in the terminal set. In response to that the ID of the first terminal carried in the third message is in the terminal set, it is determined to measure the distance between the first terminal and the second terminal. In response to that the ID of the first terminal carried in the third message is not in the terminal set, it is determined not to measure the distance between the first terminal and the second terminal.

It should be noted that those skilled in the art can understand that the methods provided in the embodiments of the present disclosure may be performed independently, or may be performed together with some methods in the embodiments of the present disclosure or some methods in related art.

As shown in FIG. 17, a ranging method is provided in an embodiment. The method is performed by a second terminal. The method includes:

In step 171, the distance between the first terminal and the second terminal is determined based on the first time difference and the second time difference. The second time difference is a time difference between a receiving time of the first message and the a sending time of the second message.

In an embodiment, when the second terminal receives the first message sent from the second terminal, the second terminal records third time information of receiving the first message. When the second terminal sends the second message to the first terminal, the second terminal records fourth time information of sending the second message. The second terminal determines the second time difference between the time of receiving the first message and the time of sending the second message based on the third time information and the fourth time information. After receiving the first time difference sent from the first terminal, the second terminal determines the difference between the first time difference and the second time difference, and determines the distance between the first terminal and the second terminal based on the difference and the electromagnetic wave propagation speed.

In an embodiment, the second terminal may determine the distance between the first terminal and the second terminal by using an average value of the measured distances within a predetermined period of time. In this way, the measurement accuracy of the distance between the first terminal and the second terminal can be improved. In an embodiment, the duration of the predetermined period of time is determined according to required measurement accuracy. In an embodiment, in response to the required measurement accuracy being greater than or equal to an accuracy threshold, it is determined that the duration of the predetermined period of time is greater than a duration threshold. Alternatively, in response to the required measurement accuracy being less than the accuracy threshold, it is determined that the duration of the predetermined period of time is less than or equal to the duration threshold.

It should be noted that those skilled in the art can understand that the methods provided in the embodiments of the present disclosure may be performed independently, or may be performed together with some methods in the embodiments of the present disclosure or some methods in related art.

In an embodiment, the first message is further used to indicate at least one of the following:

an identity ID of the first terminal;

a first random number generated by the first terminal, where the first random number is used to determine whether the first message is replayed; the first random number is encrypted based on the first public key; or a command ID of the first message.

In an embodiment, after receiving the first message sent from the first terminal, the second terminal determines whether the identity carried in the first message is a predetermined identity; in response to that the identity is the predetermined identity, the second terminal sends the second message to the first terminal after receiving the first message. In response to that the identity is not the predetermined identity, the second terminal discards the first message after receiving the first message and does not send the second message to the first terminal.

In an embodiment, the second terminal sends the second message to the first terminal in response to receiving the first message sent from the first terminal and determining that the first terminal is the predetermined terminal. Here, the predetermined terminal may be configured in a terminal set, and the terminal set includes an identity of at least one first terminal used for ranging between the first terminal and the second terminal. After receiving the first message from the first terminal, the second terminal may determine whether the identity of the first terminal carried in the first message is in the terminal set. In response to the identity of the first terminal carried in the first message being in the terminal set, the second message is sent to the first terminal.

In an embodiment, the first message carries a first random number encrypted based on the first public key, where the first random number is generated by the first terminal. After the second terminal receives the first message carrying the first random number, the second terminal sends the second message carrying the first random number to the first terminal. After the first terminal receives the second message carrying the first random number, if the first terminal receives the second message carrying the first random number again, it is determined that the first message is replayed. In response to the first message being replayed, the second message is discarded upon receipt.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure may be performed independently, or may be performed together with some methods in the embodiments of the present disclosure or some methods in related art.

In an embodiment, the second message is further used to indicate at least one of the following:

an application ID encrypted by the first secret key, where the application ID is used to trigger the second terminal to send the second message;

a first random number generated by the first terminal, where the first random number is used to determine whether the first message is replayed; here, the first random number is encrypted based on the first public key;

a second random number generated by the second terminal, where the second random number is used to determine whether the second message is replayed; here, the second random number is encrypted based on the first public key; or a command ID of the first message.

In an embodiment, different ranging applications may run in the second terminal, and application IDs of different ranging applications are different. A different application ID may indicate that the first terminal sends to the second terminal a third message containing different information. Here, third messages of different information may be third messages containing information of different formats, quantities, types, etc.

In an embodiment, the first message carries an encrypted first random number, where the first random number is generated by the first terminal. After the second terminal receives the first message carrying the first random number, if the second terminal receives the first message carrying the first random number again, it is determined that the first message is replayed.

In an embodiment, the first message carries an encrypted first random number, where the first random number is generated by the first terminal. After the second terminal receives the first message carrying the first random number, the second terminal sends a second message carrying the first random number to the first terminal. After the first terminal receives the second message carrying the first random number, if the first terminal receives the first message carrying the first random number again, it is determined that the first message is replayed.

In an embodiment, the second message carries an encrypted second random number, where the second random number is generated by the second terminal. After the first terminal receives the second message carrying the second random number, if the first terminal receives the second message carrying the second random number again, it is determined that the second message is replayed.

In an embodiment, the command ID of the first message may be used to indicate the number of times the first message is sent. For example, if the first message is broadcast for the first time, the command ID of the first message may indicate "00"; if the first message is broadcast for the second time, the command ID of the first message may indicate "01".

It should be noted that those skilled in the art can understand that the methods provided in the embodiments of the present disclosure may be performed independently, or may be performed together with some methods in the embodiments of the present disclosure or some methods in related art.

Figure 18:
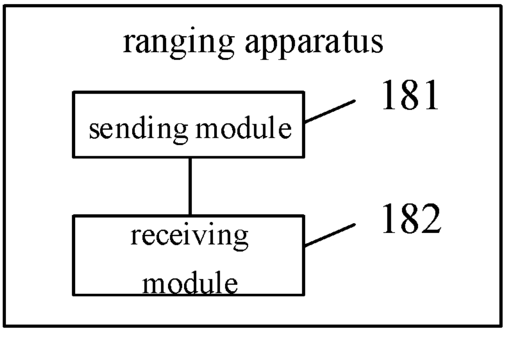
FIG. 18 is a schematic diagram of a ranging apparatus according to an exemplary embodiment.

As shown in FIG. 18, an embodiment of the present disclosure provides a ranging apparatus, including a sending module 181, configured to broadcast a first message, where the first message is used to indicate a first public key of the apparatus;

a receiving module 182, configured to receive a second message sent from a second terminal, where the second message is used to indicate a second public key of the second terminal encrypted by the first public key;

where the sending module 181 is configured to send a third message encrypted by the second public key to the second terminal, where the third message is used to indicate a first time difference between a sending time of the first message and a receiving time of the second message.

It should be noted that those skilled in the art can understand that the methods provided in the embodiments of the present disclosure may be performed independently, or may be performed together with some methods in the embodiments of the present disclosure or some methods in related art.

Figure 19:
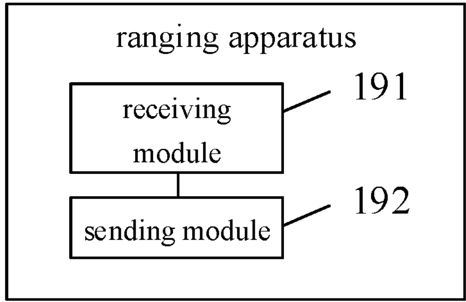
FIG. 19 is a schematic diagram of a ranging apparatus according to an exemplary embodiment.

As shown in FIG. 19, an embodiment of the present disclosure provides a ranging apparatus, including:

a receiving module 191, configured to receive a first message sent from a first terminal, where the first message is used to indicate a first public key of the first terminal;

a sending module 192, configured to send a second message to the first terminal, where the second message is used to indicate a second public key of the second terminal encrypted by the first public key;

where the receiving module 191 is configured to receive a third message encrypted by the second public key sent from the second terminal, the third message is used to indicate a first time difference between a sending time of the first message and a receiving time of the second message; the first time difference is used to determine a distance between the first terminal and the apparatus.

It should be noted that those skilled in the art can understand that the methods provided in the embodiments of the present disclosure may be performed independently, or may be performed together with some methods in the embodiments of the present disclosure or some methods in related art.

An embodiment of the present disclosure provides a communication device. The communication device includes:

a processor; and a memory for storing processor-executable instructions;

where the processor is configured to implement the methods applied to any embodiment of the present disclosure when the executable instructions are executed.

The processor may include various types of storage medium, which are non-transitory computer storage medium, and can continue to memorize information stored thereon after the communication device is powered off.

The processor may be connected to the memory through a bus or the like, and is used to read the executable program stored in the memory.

An embodiment of the present disclosure further provides a computer storage medium, where the computer storage medium stores a computer executable program, and when the executable program is executed by a processor, the method of any embodiment of the present disclosure is implemented.

Regarding the apparatus in the foregoing embodiments, the specific manner in which each module performs operations has been described in detail in the embodiments related to the methods, and will not be described in detail here.

Figure 20:
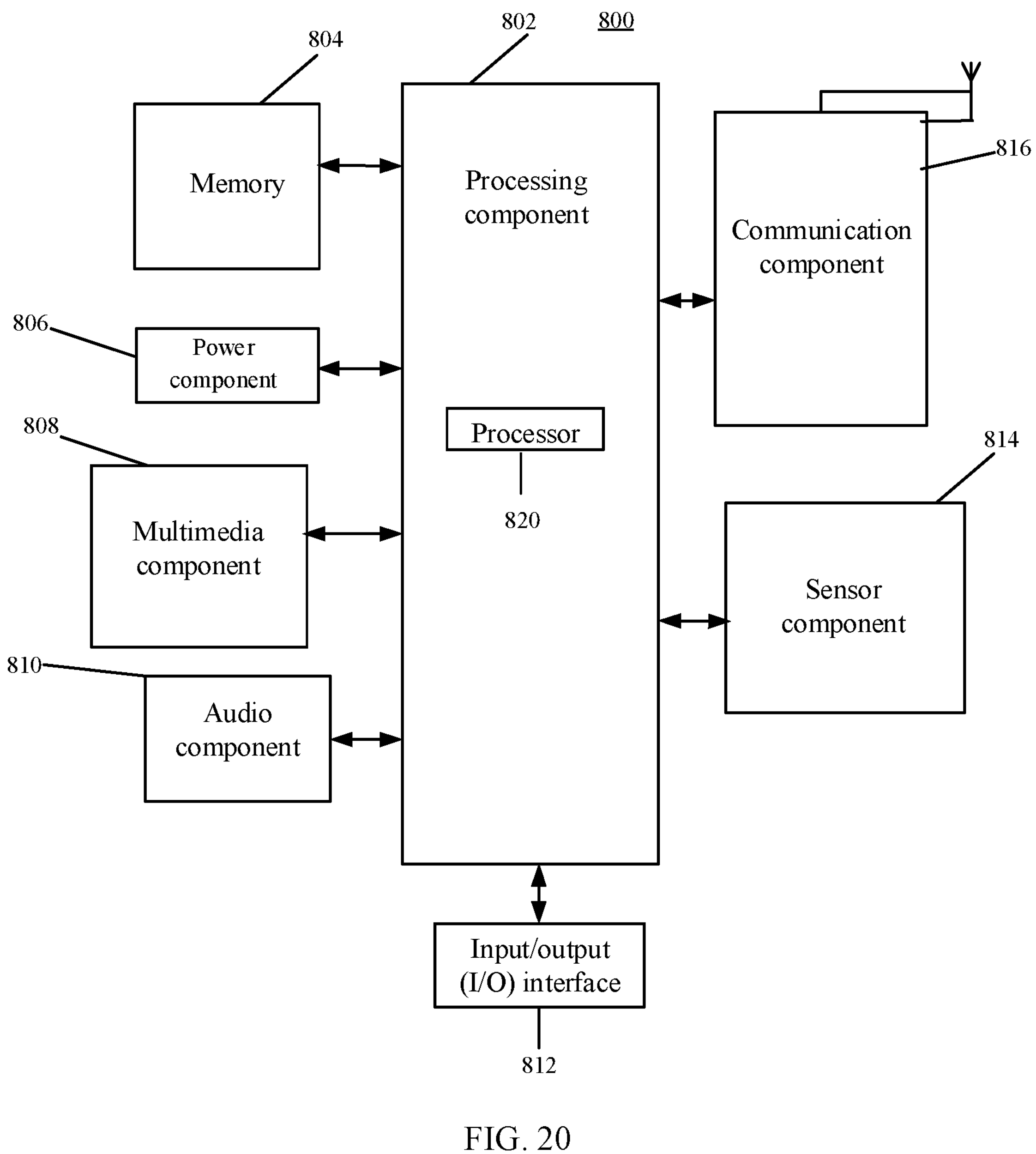
FIG. 20 is a schematic structural diagram of a terminal according to an exemplary embodiment.

As shown in FIG. 20, an embodiment of the present disclosure provides a structure of a terminal.

Referring to a terminal 800 in FIG. 20, an embodiment of the present disclosure provides a terminal 800. The terminal 800 may be a mobile phone, a computer, a digital broadcast terminal, a messaging device, a gaming console, a tablet, a medical device, exercise equipment, a personal digital assistant, and the like.

Referring to FIG. 20, the terminal 800 may include one or more of the following components: a processing component 801, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 800 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 2908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions executable by the processor 820 in the terminal 800, for performing the above-described methods. For example, the non-transitory computer-readable storage medium may be a ROM, a Random Access Memory (RAM), a CD-ROM, a magnetic tape, a floppy disc, an optical data storage device, and the like.

Figure 21:
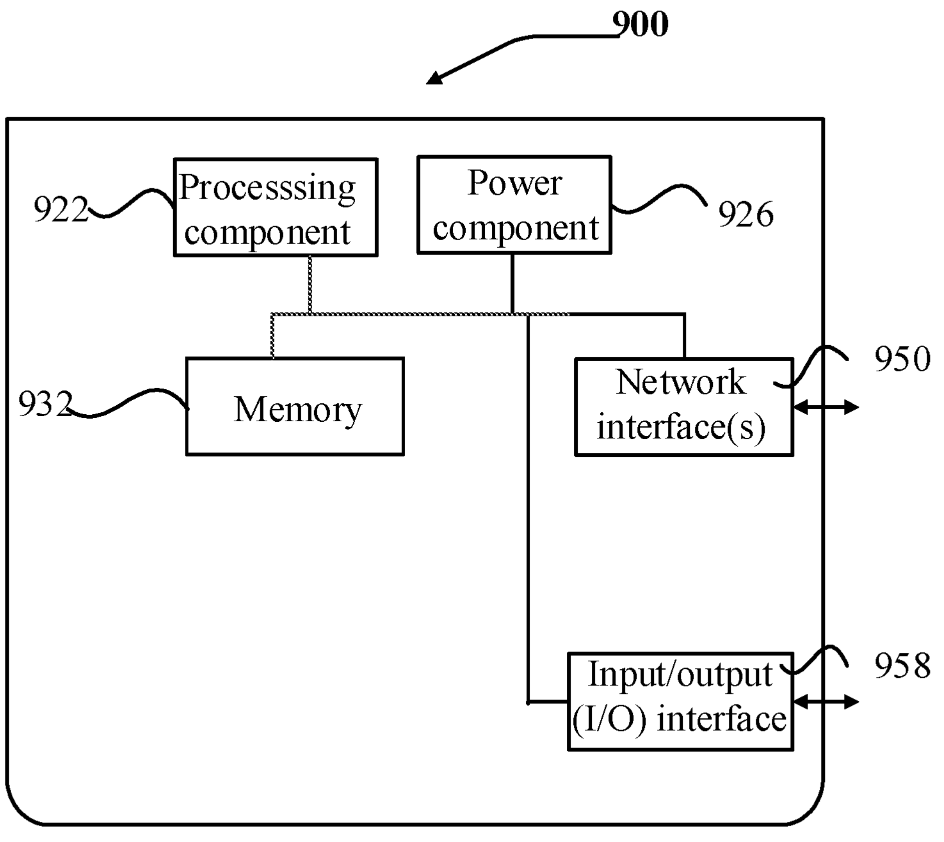
FIG. 21 is a block diagram of a base station according to an exemplary embodiment.

As shown in FIG. 21, an embodiment of the present disclosure shows a structure of a base station. For example, a base station 900 may be provided as a network side device. Referring to FIG. 21, the base station 900 includes a processing component 922 that further includes one or more processors, and memory resources represented by a memory 932 for storing instructions executable by the processing component 922, such as application programs. The application programs stored in the memory 932 may include one or more modules each corresponding to a set of instructions. Further, the processing component 922 is configured to execute the instructions to perform the above described methods which are applied at the base station.

The base station 900 may also include a power component 926 configured to perform power management of the base station 900, wired or wireless network interface(s) 950 configured to connect the device 800 to a network, and an input/output (I/O) interface 958. The base station 900 may operate based on an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A ranging method, comprising:

broadcasting, by a first terminal, a first message, wherein the first message carries a first public key of the first terminal;

receiving, by the first terminal, a second message sent from a second terminal, wherein the second message is configured to indicate a second public key of the second terminal encrypted by the first public key; and sending, by the first terminal, a third message encrypted by the second public key of the second terminal to the second terminal, wherein the third message is configured to indicate a first time difference between a sending time of the first message and a receiving time of the second message.

2. The method according to claim 1, further comprising:

performing, by the first terminal, integrity protection on at least one of the first message or the third message based on a first private key of the first terminal.

3. The method according to claim 1, further comprising:

in response to determining that the first message is replayed, discarding, by the first terminal, the second message; or in response to determining that the first message is not replayed, determining, by the first terminal, whether to send the third message according to whether the second message is replayed.

4. The method according to claim 3, wherein determining whether to send the third message according to whether the second message is replayed comprises:

in response to determining that the second message is replayed, determining, by the first terminal, not to send the third message; or in response to determining that the second message is not replayed, determining, by the first terminal, to send the third message.

5. The method according to claim 4, wherein the first message is further configured to indicate at least one of the following:

an identity (ID) of the first terminal;

a first random number generated by the first terminal, wherein the first random number is configured to determine whether the first message is replayed; or a command ID of the first message; or the third message is further configured to indicate at least one of the following:

an ID of the first terminal;

a third random number generated by the first terminal, wherein the third random number is configured to determine whether the third message is replayed; or a command ID of the first message.

6. The method according to claim 4, wherein the second message is further configured to indicate at least one of the following:

an application ID encrypted by the first public key, wherein the application ID is configured to trigger the second terminal to send the second message;

a first random number generated by the first terminal, wherein the first random number is configured to determine whether the first message is replayed;

a second random number generated by the second terminal, wherein the second random number is configured to determine whether the second message is replayed; or a command ID of the first message.

7. The method according to claim 6, wherein in response to determining that the second message indicates the first random number encrypted by the first public key, and the method further comprises:

determining, by the first terminal, that the first message is not replayed, wherein the first random number decrypted by the first private key is not a repeated random number; or determining, by the first terminal, that the first message is replayed, wherein the first random number decrypted by the first private key is a repeated random number; or in response to determining that the second message indicates the second random number encrypted by the first public key, and the method further comprises:

determining, by the first terminal, that the second message is not replayed, wherein the second random number decrypted by the first private key is not a repeated random number; or determining, by the first terminal, that the second message is replayed, wherein the second random number decrypted by the first private key is a repeated random number; or in response to determining that the second message indicates the application ID, and the method further comprises:

sending, by the first terminal, the third message determined based on the application ID to the second terminal.

8. A non-transitory computer storage medium, wherein the non-transitory computer storage medium stores computer-executable instructions, and the computer-executable instructions, when executed by a processor, implement the method according to claim 1.

9. A ranging method, comprising:

receiving, by a second terminal, a first message sent from a first terminal, wherein the first message carries a first public key of the first terminal;

sending a second message to the first terminal, wherein the second message is configured to indicate a second public key of the second terminal encrypted by the first public key; and receiving, from the first terminal, a third message encrypted by the second public key of the second terminal, wherein the third message is configured to indicate a first time difference between a sending time of the first message and a receiving time of the second message, wherein the first time difference is configured to determine a distance between the first terminal and the second terminal.

10. The method according to claim 9, further comprising:

based on the first public key of the first terminal, performing, by the second terminal, integrity protection verification on the first message; and determining, by the second terminal, whether to send the second message according to a result of the integrity protection verification.

11. The method according to claim 10, wherein determining whether to send the second message according to the result of the integrity protection verification comprises:

in response to determining that the integrity protection verification succeeds, determining, by the second terminal, to send the second message; or in response to determining that the integrity protection verification fails, determining, by the second terminal, to discard the first message and not to send the second message.

12. The method according to claim 9, further comprising:

based on the first public key of the first terminal, performing, by the second terminal. integrity protection verification on the third message.

13. The method according to claim 9, wherein the third message is further configured to indicate at least one of the following:

an ID of the first terminal;

a third random number generated by the first terminal, wherein the third random number is configured to determine whether the third message is replayed; or a command ID of the first message.

14. The method according to claim 13, wherein in response to determining that the third message indicates the third random number encrypted by the second public key, and the method further comprises:

determining, by the second terminal, that the third message is not replayed, wherein the third random number decrypted by the second private key is not a repeated random number; or determining, by the second terminal, that the third message is replayed, wherein the third random number decrypted by the second private key is a repeated random number; or in response to determining that the third message indicates the ID of the first terminal, and the method further comprises:

determining, by the second terminal, that the integrity protection verification of the third message succeeds and that the third message is not replayed; and determining whether to measure the distance between the first terminal and the second terminal according to the ID of the first terminal.

15. The method according to claim 14, wherein determining whether to measure the distance between the first terminal and the second terminal according to the ID of the first terminal comprises:

in response to determining that the ID of the first terminal is a preset ID, determining, by the second terminal, to measure the distance between the first terminal and the second terminal; or in response to determining that the ID of the first terminal is not the preset ID, determining, by the second terminal, not to measure the distance between the first terminal and the second terminal.

16. The method according to claim 15, further comprising:

determining, by the second terminal, the distance between the first terminal and the second terminal based on the first time difference and a second time difference, wherein the second time difference is a time difference between a receiving time of the first message and a sending time of the second message.

17. The method according to claim 9, wherein the first message is further configured to indicate at least one of the following:

an identity (ID) of the first terminal;

a first random number generated by the first terminal, wherein the first random number is configured to determine whether the first message is replayed; or a command ID of the first message; or the second message is further configured to indicate at least one of the following:

an application ID encrypted by the first public key, wherein the application ID is configured to trigger the second terminal to send the second message;

a first random number generated by the first terminal, wherein the first random number is configured to determine whether the first message is replayed;

a second random number generated by the second terminal, wherein the second random number is configured to determine whether the second message is replayed; or a command ID of the first message.

18. A non-transitory computer storage medium, wherein the non-transitory computer storage medium stores computer-executable instructions, and the computer-executable instructions, when executed by a processor, implement the method according to claim 9.

19. A communication device, comprising:

a memory; and a processor connected to the memory and configured to perform the method according to claim 9.

20. A communication device, comprising:

a memory; and a processor connected to the memory and configured to perform acts comprising:

broadcasting a first message, wherein the first message carries a first public key of a first terminal;

receiving a second message sent from a second terminal, wherein the second message is configured to indicate a second public key of the second terminal encrypted by the first public key; and sending a third message encrypted by the second public key of the second terminal to the second terminal, wherein the third message is configured to indicate a first time difference between a sending time of the first message and a receiving time of the second message.

* * * * *